US011248741B1

(12) United States Patent
Parniani

(10) Patent No.: US 11,248,741 B1
(45) Date of Patent: Feb. 15, 2022

(54) SECURE DOOR HANGER APPARATUS

(71) Applicant: Mahyar Mike Parniani, Riverside, CA (US)

(72) Inventor: Mahyar Mike Parniani, Riverside, CA (US)

(*) Notice: Subject to any disclaimer, the term of this patent is extended or adjusted under 35 U.S.C. 154(b) by 0 days.

(21) Appl. No.: 17/396,409

(22) Filed: Aug. 6, 2021

(51) Int. Cl.
*F16M 13/02* (2006.01)
*E05B 73/00* (2006.01)

(52) U.S. Cl.
CPC ............ *F16M 13/02* (2013.01); *E05B 73/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,368,267 A * | 11/1994 | Howard | ................. | A47G 7/044 248/208 |
| 7,887,017 B2 * | 2/2011 | Moran | ..................... | B44C 5/00 248/339 |
| 7,992,833 B1 * | 8/2011 | Goodman | ......... | A47G 25/0614 248/298.1 |
| 8,534,627 B2 * | 9/2013 | Kressin | ................. | F16M 13/02 248/307 |
| 9,307,700 B1 * | 4/2016 | Schmitt | ................. | E04H 13/001 |
| 10,898,020 B2 * | 1/2021 | Lee | ..................... | A47G 25/0614 |
| 11,076,534 B1 * | 8/2021 | Kacines | ............ | A47G 25/0614 |
| 11,160,217 B2 * | 11/2021 | Dalmolin | ................. | A01G 5/04 |
| 2003/0173483 A1 * | 9/2003 | Yeh | ........................ | A47G 7/044 248/287.1 |
| 2004/0173550 A1 * | 9/2004 | Adams | ............... | A47G 25/0614 211/118 |
| 2015/0238027 A1 * | 8/2015 | Yeh | .................... | A47G 25/0614 248/307 |
| 2020/0128758 A1 * | 4/2020 | Pestl | ........................ | A01G 5/04 |

* cited by examiner

*Primary Examiner* — Monica E Millner
(74) *Attorney, Agent, or Firm* — Entralta P.C.; Justin G. Sanders

(57) ABSTRACT

A door hanger apparatus is disclosed and configured for securely and adjustably hanging an at least one object therefrom so as to prevent theft of said object. In at least one embodiment, the apparatus provides an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to an upper end of the door. An attachment slot extends longitudinally along at least a portion of the exterior portion and the engagement portion, and is configured for slidable engagement with an attachment article.

16 Claims, 5 Drawing Sheets

SECURE DOOR HANGER APPARATUS

RELATED APPLICATIONS

Not applicable.

BACKGROUND

The subject of this patent application relates generally to door hangers, and more particularly to a door hanger apparatus configured for securely and adjustably hanging an at least one object therefrom so as to prevent theft of said object.

Applicant hereby incorporates herein by reference any and all patents and published patent applications cited or referred to in this application.

By way of background, temporary door decorations (such as holiday wreaths, for example) are traditionally hung on a door's exterior by a nail or a hook. While such hanging methods allow for easy engagement and disengagement of the decoration relative to the door, it also creates an easy opportunity for theft of the decoration. With some such decorations costing as much as $100 USD or more, this can be a serious problem. Accordingly, there remains a need for a more secure method of hanging such decorations on a door's exterior so as to prevent theft.

Additionally, when decorations are hung on a door (interior or exterior) using a traditional nail, the nail is oftentimes either left in the door after the decoration is taken down, or the nail is removed and reinserted in the same hole the next time a decoration is to be displayed (so as to not mar the door with multiple nail holes over time). Similarly, when decorations are hung on a door using a traditional hook, the hook is typically of a static length. In other words, traditional nails and hooks are often in a static position on the door, such that the decorations hung therefrom are positioned at a static height. However, different decorations may have different dimensions, which would therefore require different hanging heights for maximum visual appeal. Accordingly, there also remains a need for a method of adjustably hanging such decorations on a door from varying heights.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a door hanger apparatus configured for securely and adjustably hanging an at least one object therefrom so as to prevent theft of said object. In at least one embodiment, the apparatus provides an elongate main body sized and configured for removable engagement with an upper end of a door. The main body provides an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door. The main body further provides an at least one elongate attachment slot extending longitudinally along at least a portion of the exterior portion and the engagement portion, the at least one attachment slot providing an at least one attachment aperture having a width that is relatively larger than a width of said attachment slot. An at least one attachment article is configured for slidable engagement with the at least one attachment slot, the at least one attachment article providing an engagement end sized for approximating the width of the at least one attachment aperture so as to be insertable therethrough and subsequently retained within said attachment slot, the engagement end configured for positionally locking the attachment article at a desired position relative to the attachment slot. During use of the apparatus, with the main body disengaged from the door, the at least one attachment article can be slidably engaged with the at least one attachment slot and positionally locked in the desired position relative to the attachment slot, such that the main body can then be engaged with the upper end of the door, and the door subsequently closed, thereby preventing the at least one attachment article from being disengaged from the corresponding attachment slot.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
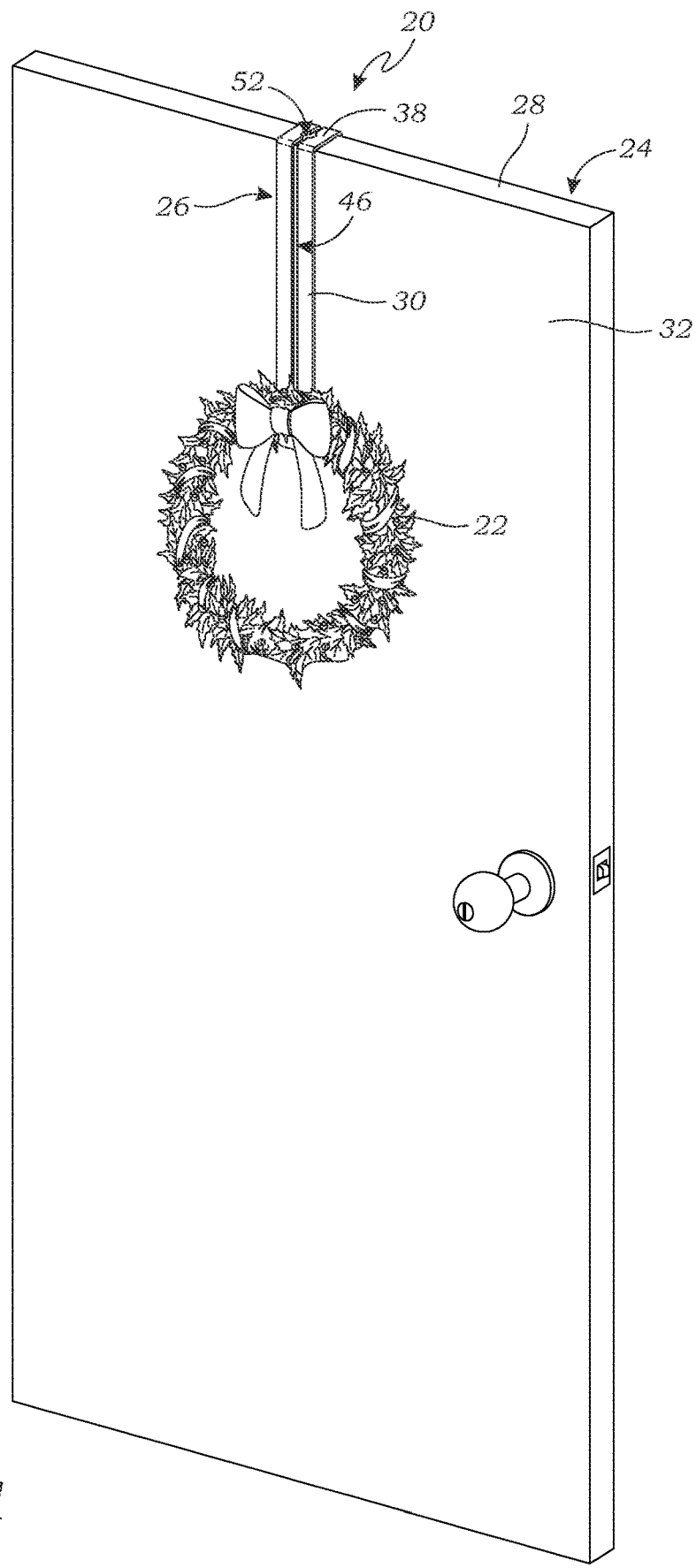
FIG. 1 is a perspective view of an exemplary secure door hanger apparatus engaged with an exemplary object and positioned on an exemplary door, in accordance with at least one embodiment.

Turning now to FIG. 1, there is shown a perspective view of an exemplary secure door hanger apparatus 20 engaged with an exemplary decoration (hereinafter generally referred to as an "object" 22 for simplicity purposes) and positioned on an exemplary door 24, in accordance with at least one embodiment. At the outset, it should be noted that while the object 22 is depicted as a wreath in FIG. 1 for illustrative purposes, in further embodiments, the apparatus 20 is capable of engagement with any other type of object 22 (having any other dimensions) that is desired to be hung from the door 24.

Figure 2:
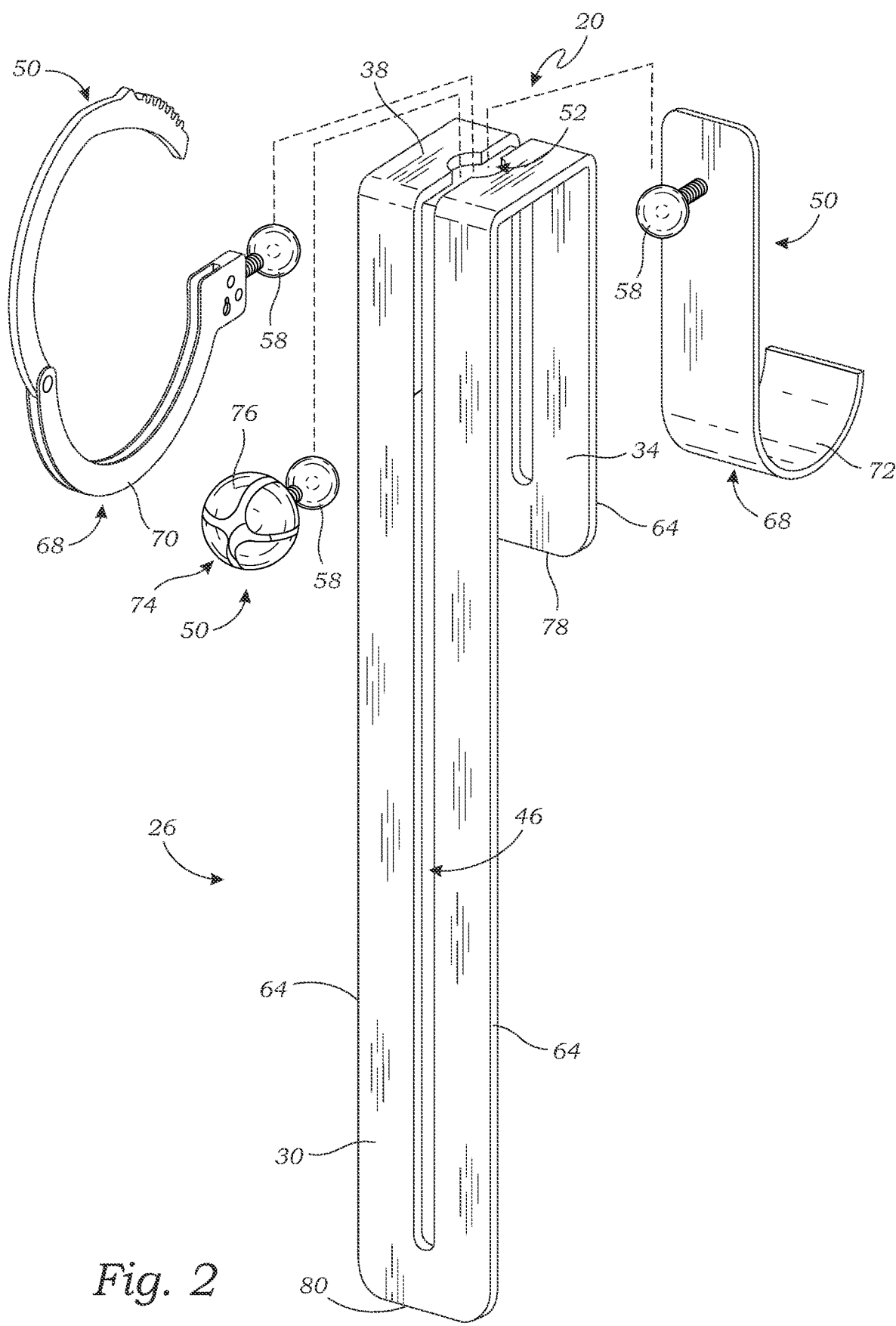
FIG. 2 is an exploded view of the exemplary secure door hanger apparatus, in accordance with at least one embodiment.
Figure 3:
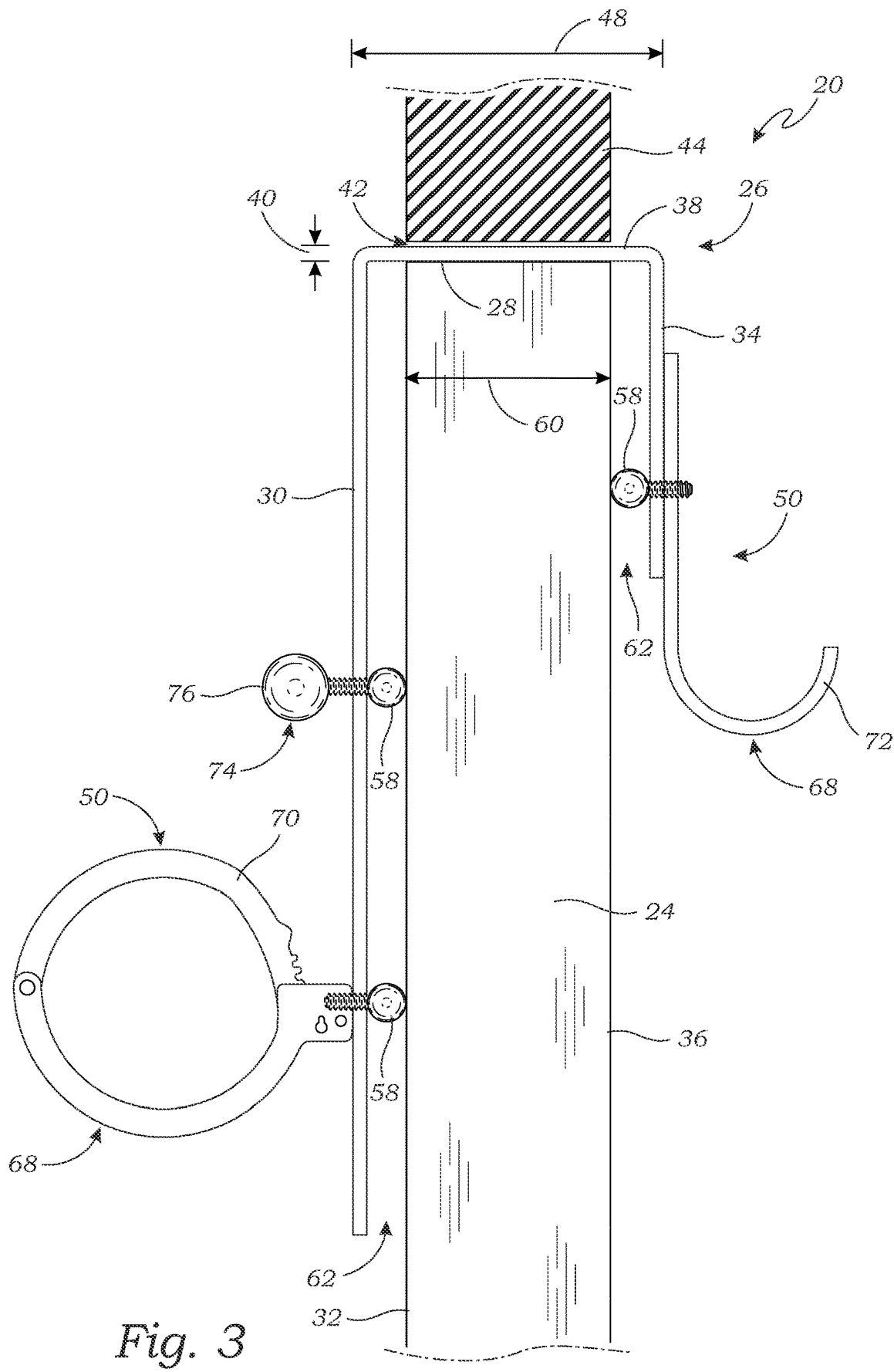
FIG. 3 is a partial side view of the exemplary secure door hanger apparatus positioned on an exemplary door, in accordance with at least one embodiment.

With continued reference to FIG. 1, and as further illustrated in FIGS. 2 and 3, in at least one embodiment, the apparatus 20 is comprised of an elongate main body 26 sized and configured for removable engagement with an upper end 28 of the door 24. In at least one embodiment, the main body 26 is constructed out of at least one of metal, plastic, wood or rubber. However, in further embodiments, the main body 26 may be constructed out of any other material (or combination of materials) now known or later developed, so long as the apparatus 20 is capable of substantially carrying out the functionality described herein.

In at least one embodiment, the main body 26 provides an elongate exterior portion 30 configured for being positioned adjacent to an exterior surface 32 of the door 24 (i.e., the surface of the door 24 facing away from the room to which the door 24 provides access), an elongate interior portion 34 configured for being positioned adjacent to an interior surface 36 of the door 24 (i.e., the surface of the door 24 facing toward the room to which the door 24 provides access), and an engagement portion 38 interconnecting the exterior and interior portions 30 and 34 and configured for being positioned adjacent to the upper end 28 of the door 24. In at least one embodiment, the engagement portion 38 has a thickness 40 that is less than or equal to a clearance space 42 between the upper end 28 of the door 24 and a head jamb 44 of a door frame in which the door 24 is installed, thereby allowing the door 24 to freely open and close when the apparatus 20 is engaged therewith. In at least one embodiment, the exterior portion 30, engagement portion 38 and interior portion 34 are a single unitary piece, such that the exterior portion 30, engagement portion 38 and interior portion 34 have a substantially uniform thickness. However, in at least one alternate embodiment, the exterior portion 30, engagement portion 38 and interior portion 34 may be separate pieces that are engaged with one another and/or have varying thicknesses. In that regard, it should be noted that the sizes, shapes, and dimensions of each of the exterior portion 30, engagement portion 38 and interior portion 34 depicted in the drawings are merely illustrative, such that in further embodiments, the exterior portion 30, engagement portion 38 and interior portion 34 may take on any other sizes, shapes and/or dimensions now known or later developed, so long as the apparatus 20 is capable of substantially carrying out the functionality described herein.

In at least one embodiment, the main body 26 provides an at least one elongate attachment slot 46 extending longitudinally along at least a portion of the exterior portion 30 and the engagement portion 38. In at least one further embodiment, the at least one attachment slot 46 extends longitudinally along an entire length 48 of the engagement portion 38 along with at least a portion of each of the exterior portion 30 and interior portion 34 as well. As discussed further below, the at least one attachment slot 46 is configured for slidable engagement with an at least one attachment article 50. Additionally, in at least one embodiment, the at least one attachment slot 46 provides an at least one attachment aperture 52 having a width 54 that is relatively larger than a width 56 of the corresponding attachment slot 46, with the at least one attachment aperture 52 configured for receiving an engagement end 58 of the attachment article 50 therethrough. Accordingly, once the engagement end 58 of the attachment article 50 is inserted through the attachment aperture 52, the attachment article 50 is capable of slidably traversing along the attachment slot 46. Furthermore, the width 56 of the attachment slot 46 is sized for preventing the engagement end 58 of the attachment article 50 from being disengaged therefrom, such that the only way for the attachment article 50 to be subsequently removed from the attachment slot 46 is via the at least one attachment aperture 52.

In at least one embodiment, when the at least one attachment article 50 is positioned within the at least one attachment slot 46, the engagement end 58 of the at least one attachment article 50 is configured for positionally locking the attachment article 50 at a desired position relative to the attachment slot 46. In at least one such embodiment, the engagement end 58 is threadably engaged with the attachment article 50, such that once the engagement end 58 is inserted through the at least one attachment aperture 52 and the attachment article 50 is slidably moved along the attachment slot 46 into the desired position, the engagement end 58 is threadably tightened against the main body 26, thereby frictionally holding the attachment article 50 in position against the main body 26. Should it be desired to subsequently relocate or remove the attachment article 50 from the apparatus 20, the engagement end 58 is threadably loosened. In further embodiments, any other mechanism (or combination of mechanisms) now known or later developed, capable of positionally locking the attachment article 50 relative to the attachment slot 46, may be substituted. In at least one embodiment, as illustrated best in FIG. 3, the engagement portion 38 has a length 48 sufficient for accommodating a thickness 60 of the door 24 while also creating an engagement space 62 between at least one of the exterior portion 30 and the exterior surface 32 of the door 24, and the interior portion 34 and the interior surface 36 of the door 24. The engagement space 62 is sized for accommodating the engagement end 58 of the at least one attachment article 50. In at least one such embodiment, the engagement space 62 is sized for accommodating the engagement end 58 of the at least one attachment article 50 when the engagement end 58 is tightened against the main body 26, so as to prevent the engagement end 58 from being loosened when the apparatus 20 is positioned on the door 24.

Figure 4:
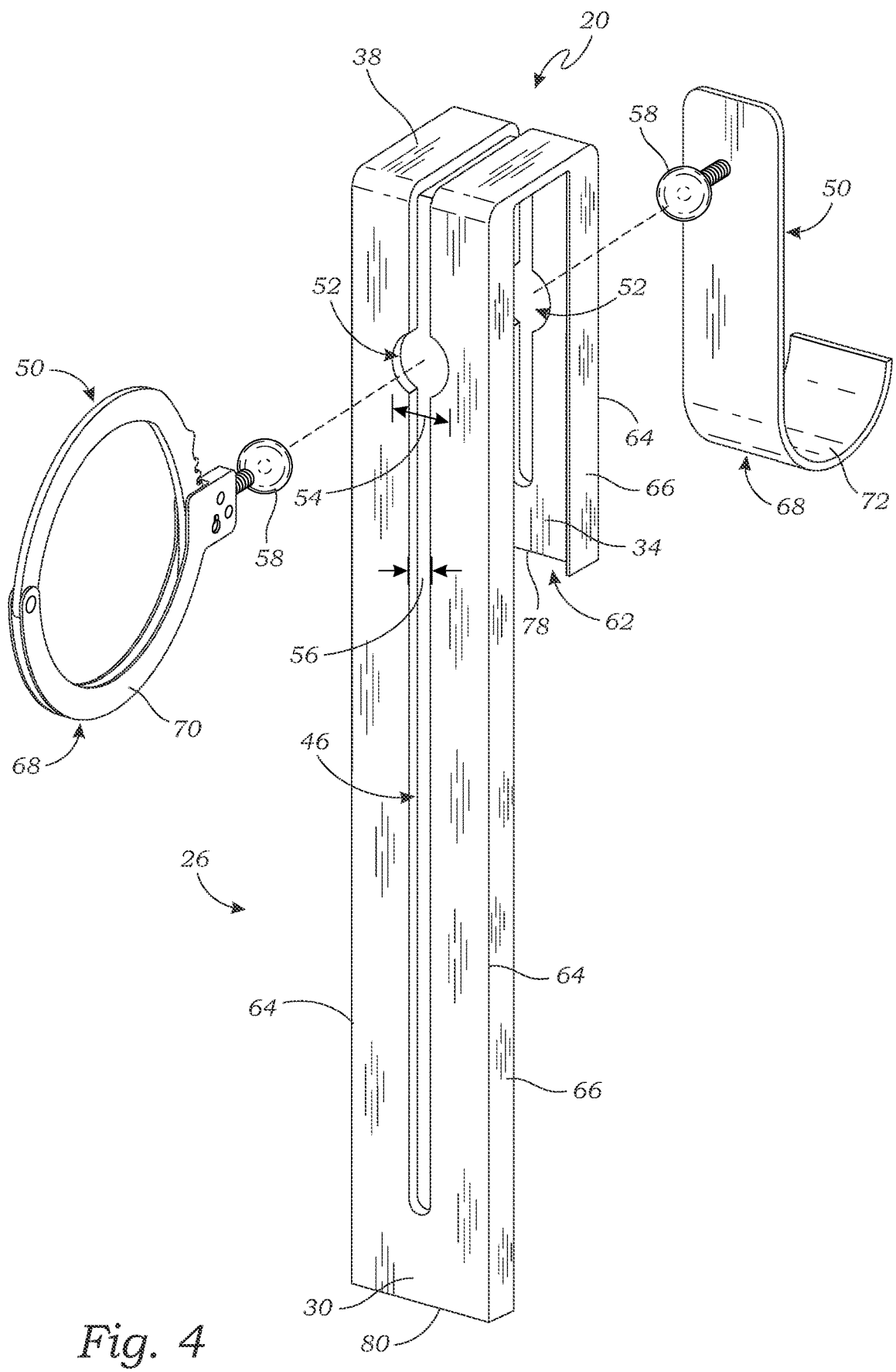
FIG. 4 is an exploded view of a further exemplary secure door hanger apparatus, in accordance with at least one embodiment.
Figure 5:
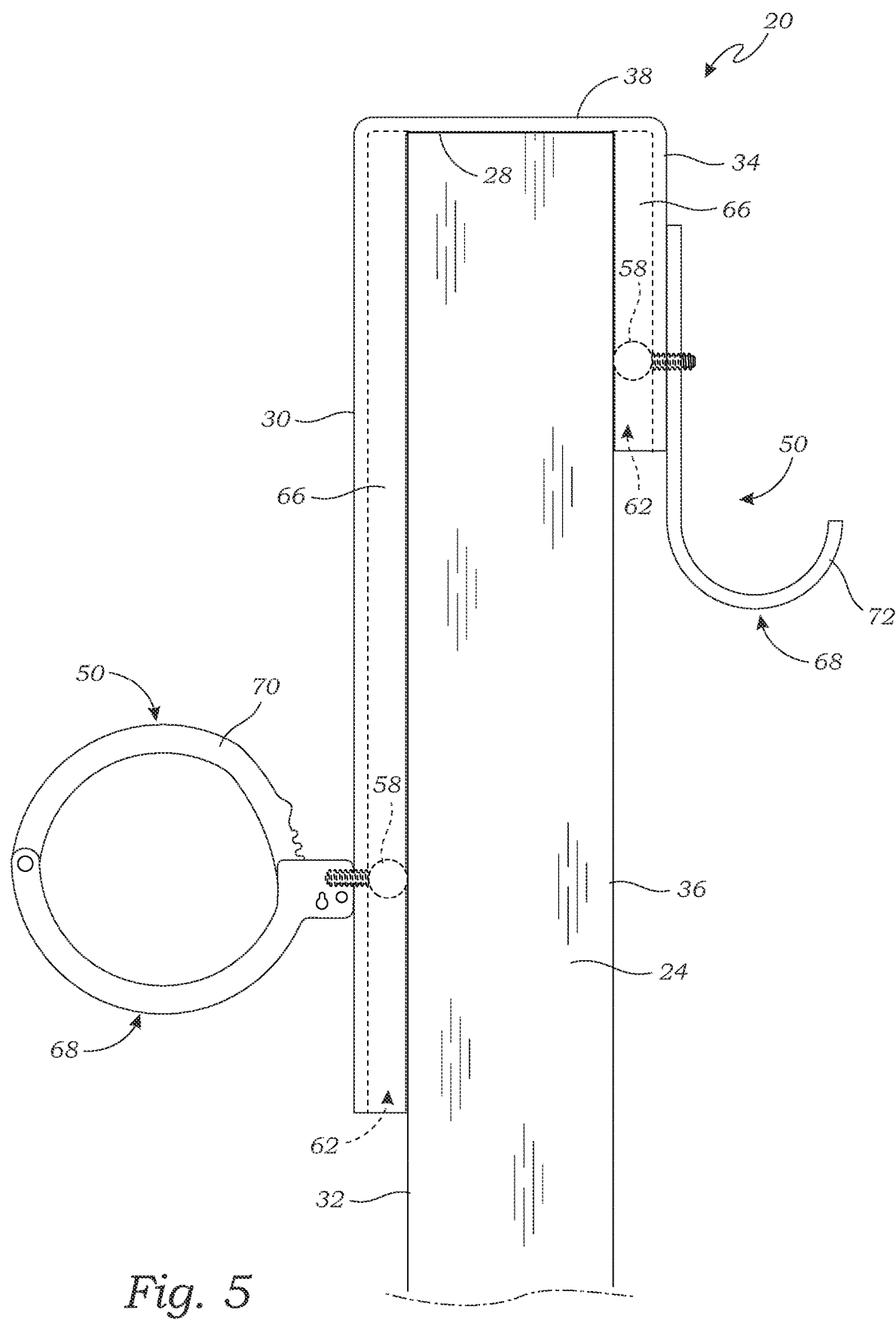
FIG. 5 is a partial side view of the further exemplary secure door hanger apparatus positioned on an exemplary door, in accordance with at least one embodiment.

In at least one embodiment, as illustrated best in FIG. 2, the at least one attachment aperture 52 is positioned on the engagement portion 38, such that when the door 24 is closed, the head jamb 44 of the door frame obstructs the attachment aperture 52, thereby preventing the at least one attachment article 50 from being disengaged from the corresponding attachment slot 46 which, in turn, prevents the at least one attachment article 50 from being stolen so long as the door 24 remains closed. In at least one alternate embodiment, as illustrated in FIGS. 4 and 5, the at least one attachment aperture 52 is positioned on one or both of the exterior portion 30 and interior portion 34. In at least one such embodiment, opposing lateral edges 64 of one or both of the exterior portion 30 and interior portion 34 provide a side wall 66 extending between the lateral edge 64 and the corresponding surface 32 or 36 of the door 24, thereby obstructing access to the engagement end 58 of the at least one attachment article 50, and preventing the engagement end 58 from being loosened or otherwise positionally unlocked, when the apparatus 20 is positioned on the door 24. In that regard, it should be noted that the sizes, shapes, dimensions, quantities and relative positions of the at least one attachment slot 46, along with the at least one attachment aperture 52, depicted in the drawings are merely illustrative, such that in further embodiments, the at least one attachment slot 46, along with the at least one attachment aperture 52, may take on any other sizes, shapes, dimensions, quantities and/or relative positions now known or later developed, so long as the apparatus 20 is capable of substantially carrying out the functionality described herein.

As best illustrated in FIGS. 2 and 4, the at least one attachment article 50 may take on virtually any configuration, now known or later developed. In at least one embodiment, the attachment article 50 is an object attachment 68 configured for engagement with an object 22. In at least one such embodiment, the object attachment 68 is a selectively lockable ring 70, allowing the object 22 to be secured to the object attachment 68 so as to prevent theft of the object 22. In at least one alternate embodiment, the object attachment 68 is a hook 72, allowing the object 22 to be selectively hung therefrom. In at least one further alternate embodiment, the attachment article 50 is an accessory attachment 74 (i.e., a standalone object 22 that is directly engageable with the at least one attachment slot 46, rather than being indirectly engaged via an object attachment 68), such as a bell 76 for example, which can add further decoration to the door 24 or even further security. In at least one still further embodiment (not shown), a terminal end 78 of the interior portion 34 is configured as a hook. In at least one still further embodiment (also not shown), a terminal end 80 of the exterior portion 30 is configured as a hook.

In use, in at least one embodiment, with the apparatus 20 disengaged from the door 24, the at least one attachment article 50 is slidably engaged with the at least one attachment slot 46, then positionally locked in the desired position relative to the attachment slot 46. The apparatus 20 is then engaged with the upper end 28 of the door 24, and the door 24 is subsequently closed, thereby preventing the at least one attachment article 50 from being disengaged from the corresponding attachment slot 46. Where the attachment article 50 is configured for engagement with an object 22, the object 22 is then engaged with the attachment article 50.

Aspects of the present specification may also be described as the following embodiments:

1. A door hanger apparatus comprising: an elongate main body sized and configured for removable engagement with an upper end of a door; the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door; the main body further providing an at least one elongate attachment slot extending longitudinally along at least a portion of the exterior portion and the engagement portion, the at least one attachment slot providing an at least one attachment aperture having a width that is relatively larger than a width of said attachment slot; and an at least one attachment article configured for slidable engagement with the at least one attachment slot, the at least one attachment article providing an engagement end sized for approximating the width of the at least one attachment aperture so as to be insertable therethrough and subsequently retained within said attachment slot, the engagement end configured for positionally locking the attachment article at a desired position relative to the attachment slot; whereby, during use of the apparatus, with the main body disengaged from the door, the at least one attachment article can be slidably engaged with the at least one attachment slot and positionally locked in the desired position relative to the attachment slot, such that the main body can then be engaged with the upper end of the door, and the door subsequently closed, thereby preventing the at least one attachment article from being disengaged from the corresponding attachment slot.

2. The door hanger apparatus according to embodiment 1, wherein the main body is constructed out of at least one of metal, plastic, wood and rubber.

3. The door hanger apparatus according to embodiments 1-2, wherein the engagement portion has a thickness that is less than or equal to a clearance space between the upper end of the door and a head jamb of a door frame in which the door is installed, thereby allowing the door to freely open and close when the apparatus is engaged therewith.

4. The door hanger apparatus according to embodiments 1-3, wherein the exterior portion, engagement portion and interior portion are a single unitary piece, with the exterior portion, engagement portion and interior portion having a substantially uniform thickness.

5. The door hanger apparatus according to embodiments 1-4, wherein the at least one attachment slot extends longitudinally along an entire length of the engagement portion along with at least a portion of each of the exterior portion and interior portion.

6. The door hanger apparatus according to embodiments 1-5, wherein the engagement end is threadably engaged with the attachment article, whereby upon the engagement end being inserted through the at least one attachment aperture and the attachment article being slidably moved along the attachment slot into a desired position, the engagement end is capable of being threadably tightened against the main body, thereby frictionally holding the attachment article in the desired position against the main body.

7. The door hanger apparatus according to embodiments 1-6, wherein the engagement portion has a length sufficient for accommodating a thickness of the door while also creating an engagement space between at least one of the exterior portion and the exterior surface of the door, and the interior portion and the interior surface of the door, the engagement space sized for accommodating the engagement end of the at least one attachment article.

8. The door hanger apparatus according to embodiments 1-7, wherein the engagement space is sized for accommodating the engagement end of the at least one attachment article when the engagement end is tightened against the main body.

9. The door hanger apparatus according to embodiments 1-8, wherein the at least one attachment aperture is positioned on the engagement portion.

10. The door hanger apparatus according to embodiments 1-9, wherein the at least one attachment aperture is positioned on at least one of the exterior portion and interior portion.

11. The door hanger apparatus according to embodiments 1-10, wherein opposing lateral edges of at least one of the exterior portion and interior portion each provides a side wall extending between said lateral edge and the corresponding surface of the door, thereby obstructing access to the engagement end of the at least one attachment article when the apparatus is positioned on the door.

12. The door hanger apparatus according to embodiments 1-11, wherein the at least one attachment article is an object attachment configured for engagement with an object.

13. The door hanger apparatus according to embodiments 1-12, wherein the object attachment is a selectively lockable ring.

14. The door hanger apparatus according to embodiments 1-13, wherein the object attachment is a hook.

15. The door hanger apparatus according to embodiments 1-14, wherein the at least one attachment article is an accessory attachment.

16. The door hanger apparatus according to embodiments 1-15, wherein the accessory attachment is a bell.

17. A door hanger apparatus comprising: an elongate main body sized and configured for removable engagement with an upper end of a door; the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door; the main body further providing an at least one elongate attachment slot extending longitudinally along at least a portion of the exterior portion and the engagement portion, the at least one attachment slot providing an at least one attachment aperture positioned on the engagement portion and having a width that is relatively larger than a width of said attachment slot; and an at least one attachment article configured for slidable engagement with the at least one attachment slot, the at least one attachment article providing an engagement end sized for approximating the width of the at least one attachment aperture so as to be insertable therethrough and subsequently retained within said attachment slot, the engagement end configured for positionally locking the attachment article at a desired position relative to the attachment slot; whereby, during use of the apparatus, with the main body disengaged from the door, the at least one attachment article can be slidably engaged with the at least one attachment slot and positionally locked in the desired position relative to the attachment slot, such that the main body can then be engaged with the upper end of the door, and the door subsequently closed, thereby preventing the at least one attachment article from being disengaged from the corresponding attachment slot.

18. A door hanger apparatus configured for securely and adjustably hanging an at least one object therefrom, the apparatus comprising: an elongate main body sized and configured for removable engagement with an upper end of a door; the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door; the main body further providing an at least one elongate attachment slot extending longitudinally along at least a portion of the exterior portion and the engagement portion, the at least one attachment slot providing an at least one attachment aperture having a width that is relatively larger than a width of said attachment slot; and an at least one lockable ring engageable with the at least one object and configured for slidable engagement with the at least one attachment slot, the at least one lockable ring providing an engagement end sized for approximating the width of the at least one attachment aperture so as to be insertable therethrough and subsequently retained within said attachment slot, the engagement end configured for positionally locking the lockable ring at a desired position relative to the attachment slot; whereby, during use of the apparatus, with the main body disengaged from the door, the at least one lockable ring can be slidably engaged with the at least one attachment slot and positionally locked in the desired position relative to the attachment slot, such that the main body can then be engaged with the upper end of the door, and the door subsequently closed, thereby preventing the at least one lockable ring, along with the at least one object, from being disengaged from the corresponding attachment slot.

In closing, regarding the exemplary embodiments of the present invention as shown and described herein, it will be appreciated that a door hanger apparatus is disclosed and configured for securely and adjustably hanging an at least one object therefrom so as to prevent theft of said object. Because the principles of the invention may be practiced in a number of configurations beyond those shown and described, it is to be understood that the invention is not in any way limited by the exemplary embodiments, but is generally directed to a secure door hanger apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods and the order in which the respective elements of each method are performed are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A door hanger apparatus comprising:
    an elongate main body sized and configured for removable engagement with an upper end of a door;
    the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door;
    the main body further providing an at least one elongate attachment slot extending longitudinally along at least a portion of the exterior portion and the engagement portion, the at least one attachment slot providing an at least one attachment aperture having a width that is relatively larger than a width of said attachment slot;
    an at least one attachment article configured for slidable engagement with the at least one attachment slot, the at least one attachment article providing an engagement end sized for approximating the width of the at least one attachment aperture so as to be insertable therethrough and subsequently retained within said attachment slot; and
    the engagement end threadably engaged with the attachment article, wherein upon the engagement end being inserted through the at least one attachment aperture and the attachment article being slidably moved along the attachment slot into a desired position, the engagement end is capable of being threadably tightened against the main body, thereby frictionally holding the attachment article at a desired position relative to the attachment slot;
    wherein, during use of the apparatus, with the main body disengaged from the door, the at least one attachment article can be slidably engaged with the at least one attachment slot and positionally locked in the desired position relative to the attachment slot, such that the main body can then be engaged with the upper end of the door, and the door subsequently closed, thereby preventing the at least one attachment article from being disengaged from the corresponding attachment slot.

2. The door hanger apparatus of claim 1, wherein the main body is constructed out of at least one of metal, plastic, wood and rubber.

3. The door hanger apparatus of claim 1, wherein the engagement portion has a thickness that is less than or equal to a clearance space between the upper end of the door and a head jamb of a door frame in which the door is installed, thereby allowing the door to freely open and close when the apparatus is engaged therewith.

4. The door hanger apparatus of claim 3, wherein the exterior portion, engagement portion and interior portion are a single unitary piece, with the exterior portion, engagement portion and interior portion having a substantially uniform thickness.

5. The door hanger apparatus of claim 1, wherein the at least one attachment slot extends longitudinally along an entire length of the engagement portion along with at least a portion of each of the exterior portion and interior portion.

6. The door hanger apparatus of claim 1, wherein the engagement portion has a length sufficient for accommodating a thickness of the door while also creating an engagement space between at least one of the exterior portion and the exterior surface of the door, and the interior portion and the interior surface of the door, the engagement space sized for accommodating the engagement end of the at least one attachment article.

7. The door hanger apparatus of claim 1, wherein the at least one attachment aperture is positioned on the engagement portion.

8. The door hanger apparatus of claim 1, wherein the at least one attachment aperture is positioned on at least one of the exterior portion and interior portion.

9. The door hanger apparatus of claim 8, wherein opposing lateral edges of at least one of the exterior portion and interior portion each provides a side wall extending between said lateral edge and the corresponding surface of the door, thereby obstructing access to the engagement end of the at least one attachment article when the apparatus is positioned on the door.

10. The door hanger apparatus of claim 1, wherein the at least one attachment article is an object attachment configured for engagement with an object.

11. The door hanger apparatus of claim 10, wherein the object attachment is a selectively lockable ring.

12. The door hanger apparatus of claim 10, wherein the object attachment is a hook.

13. The door hanger apparatus of claim 1, wherein the at least one attachment article is an accessory attachment.

14. The door hanger apparatus of claim 13, wherein the accessory attachment is a bell.

15. A door hanger apparatus comprising:
    an elongate main body sized and configured for removable engagement with an upper end of a door;
    the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door;
    the main body further providing an at least one elongate attachment slot extending longitudinally along at least a portion of the exterior portion and the engagement portion, the at least one attachment slot providing an at least one attachment aperture positioned on the engagement portion and having a width that is relatively larger than a width of said attachment slot; and
    an at least one attachment article configured for slidable engagement with the at least one attachment slot, the at least one attachment article providing an engagement end sized for approximating the width of the at least one attachment aperture so as to be insertable therethrough and subsequently retained within said attachment slot, the engagement end configured for positionally locking the attachment article at a desired position relative to the attachment slot;
    wherein, during use of the apparatus, with the main body disengaged from the door, the at least one attachment article can be slidably engaged with the at least one attachment slot and positionally locked in the desired position relative to the attachment slot, such that the main body can then be engaged with the upper end of the door, and the door subsequently closed, thereby preventing the at least one attachment article from being disengaged from the corresponding attachment slot.

16. A door hanger apparatus configured for securely and adjustably hanging an at least one object therefrom, the apparatus comprising:

an elongate main body sized and configured for removable engagement with an upper end of a door;

the main body providing an elongate exterior portion configured for being positioned adjacent to an exterior surface of the door, an elongate interior portion configured for being positioned adjacent to an interior surface of the door, and an engagement portion interconnecting the exterior and interior portions and configured for being positioned adjacent to the upper end of the door;

the main body further providing an at least one elongate attachment slot extending longitudinally along at least a portion of the exterior portion and the engagement portion, the at least one attachment slot providing an at least one attachment aperture having a width that is relatively larger than a width of said attachment slot; and an at least one lockable ring engageable with the at least one object and configured for slidable engagement with the at least one attachment slot, the at least one lockable ring providing an engagement end sized for approximating the width of the at least one attachment aperture so as to be insertable therethrough and subsequently retained within said attachment slot, the engagement end configured for positionally locking the lockable ring at a desired position relative to the attachment slot;

wherein, during use of the apparatus, with the main body disengaged from the door, the at least one lockable ring can be slidably engaged with the at least one attachment slot and positionally locked in the desired position relative to the attachment slot, such that the main body can then be engaged with the upper end of the door, and the door subsequently closed, thereby preventing the at least one lockable ring, along with the at least one object, from being disengaged from the corresponding attachment slot.

\* \* \* \* \*